United States Patent Office 2,981,713
Patented Apr. 25, 1961

2,981,713
POLYESTER MOLDING COMPOSITION

James S. Hanson, Norwalk, Conn., assignor to The Fairbanks Company, New York, N.Y., a corporation of New York No Drawing. Filed Oct. 28, 1957, Ser. No. 692,560

12 Claims. (Cl. 260—40)

My invention relates to a new and improved molding composition consisting of binder resin or binder plastic and a filler material, to articles molded from said composition, and to a new and improved method of making such articles from said composition.

The molding composition of the invention has particular application to the manufacture of industrial wheels such as are used for hand-trucks, lift-trucks, and similar equipment. Such wheels in normal use are subjected to serve abuse and wear, and come into contact with grease, oils and various chemicals. While the use of my molding composition for the fabrication of industrial wheels is stressed herein, it will be appreciated that it may be used in making other articles which must withstand heavy wear, such as gears, cams, ratchets, valves and the like, particularly articles which require heavy wall sections.

It has been well known to make wheels from a thermoset phenol-aldehyde resin and a filler. The filler has included various cellulosic materials, such as cotton cloth, wood fiber, wood flour, etc.

The use of such thermoset phenol-aldehyde resin or plastic involves large manufacturing costs and many difficulties in manufacture, and the finished wheels are subject to numerous disadvantages. In the commercial production of an industrial wheel or similar article from a phenol-formaldehyde resin and a cellulosic filler, said filler is mixed with a catalyst and the starting resin material, which has about 37% by weight of water. This mixture is then dried in an infrared oven at less than 212° F. until the water is substantially removed and a charge is then weighed out and preformed in a pre-form press and mold to reduce the bulk factor from 10 to 1 to approximately 1½ to 1 or less. Very expensive preform molds and presses are required for this purpose. The pre-formed piece is then run through another infrared oven at about 260° F. to set the resin and remove additional volatiles. The pre-formed shape is then finally molded at very high pressures of about 3000 to 8000 pounds per square inch for a long period of 15 minutes to 25 minutes or more. During this molding operation, in order to further remove volatiles, it is necessary to release the pressure in the mold several times, permitting the escape of gases. This is necessary to distribute the resin properly in the filler and to eliminate the volatiles, so as to minimize bubbles and crazing. This standard process requires high labor cost, expensive equipment, many additional operations, and results in slow production. Since phenolic resins form volatile by-products when cross-linked, the removal of water from the molding composition is a difficult and expensive, but necessary precaution. It is necessary, for example, to mold the material for a long period and at very high molding pressures to insure proper distribution of the resin with the filler and to dissipate the volatile elements, which can cause "resin-rich" areas or crazing in the article.

It has also been proposed to make molding compositions containing thermosetting phenol-aldehyde resins and as a fibrous filler, nylon filament, yarns or fabrics. However, such molding compositions and molded products produced therefrom are subject to substantially all of the disadvantages above described and have therefore not received wide commercial acceptance.

It is an object of this invention to provide a new molding composition which will not be subject to the above disadvantages. Another object of this invention is the provision of a novel molded article, particularly in industrial wheel or the like, having highly improved and unexpected properties. Still another object of this invention is the provision of a process employing such improved molded compositions for producing molded articles. Other objects and advantages will appear as the description proceeds.

The attainment of the above objects is made possible by the instant invention which includes a molding composition comprising as a binder, a mixture of styrene and unsaturated polyester resin obtained by reaction of a glycol with a member of the group consisting of alpha ethylenically unsaturated alpha beta dicarboxylic acids and mixtures thereof with saturated dicarboxylic acids, a catalyst for accelerating the copolymerization of said styrene and polyester resin, and for each part by weight of said binder, about 0.5 to 0.7 part of a fibrous filler consisting of small cloth pieces having a basis of molecularly oriented, high tenacity, hydrophobic, synthetic, organic, thermoplastic, linear polymeric fibers melting above about 450° F. The instant invention also includes a method for producing an improved molded article by subjecting the above defined molding composition to a molding operation under such conditions of temperature and pressure that the surfaces of said fibers are fused and integrally bonded into the thermoset copolymerized mixture of styrene and polyester resin in the binder. My invention also includes molded articles and particularly molded industrial wheels made in accordance with the foregoing process. Industrial wheels made in accordance with my invention, when tested according to the methods of the American Society for Testing Materials, have been shown, in contrast to wheels made of phenolic resins and a cellulose filler, to have tremendous impact strength, distortion resistance at high pressures and temperatures, extremely low absorption, exceptional heat conductivity and heat radiation, and high resistance to abrasion.

The binder resins employed in the molding compositions of my invention are well known in the art and no claim is made thereto per se. Such binder resins, including styrene and unsaturated polyester resins, and their methods of production, are disclosed for example in a plurality of U.S. patents such as 2,255,313, and 2,443,735–41 among others.

As glycols which may be employed in producing the unsaturated polyester resins, there may be mentioned ethylene glycol, propylene glycol, the 1,2-, 1,3-, and 1,4-butane diols, the 1,2-, 1,3- 1,4-, and 1,5-pentane diols, 1,6-hexane diol and the like.

As the alpha ethylenically unsaturated alpha beta dicarboxylic acids to be employed for esterification of the glycol, there may be mentioned maleic, fumaric, aconitic, itaconic, mono chloro maleic acids and the like. These unsaturated acids should be present in an amount approximating at least 20% by weight of the total weight of the polycarboxylic acids used for esterifying the glycols present and up to 100%. If desired, from 0 to 80% of the total weight of polycarboxylic acids may be saturated polycarboxylic acids, that is, those which are free of non-benzenoid unsaturation, as exemplified by the saturated aliphatic polycarboxylic acids such as malonic, succinic, glutaric, sebacic, suberic, and pimelic acids, and the benzene dicarboxylic acids such as benzoyl phthalic acid, chlorinated phthalic acids, such as tetrachlorophthalic acid, and hexachloroendomethylene tetrahydrophthalic acid, and especially phthalic acid. Whenever available, the anhydrides of these acids may be used or mixtures of the acids and anhydrides. Maleic anhydride and mixtures thereof with phthalic anhydride are preferred as the polycarboxylic acids to be reacted with the glycol in the production of the unsaturated polyester resins employed herein.

In carrying out the polyesterification reaction between the glycol and the dicarboxylic acids, an approximately equimolar amount of the glycol and preferably an excess of about 10% thereof above the stoichiometric quantity required for complete esterification of the dicarboxylic acids should be employed. The reaction is carried out by heating either in an open vessel or preferably in a closed vessel in an inert atmosphere such as carbon dioxide or nitrogen at a temperature of between about 300 to 460° F., stopping the reaction at the desired degree of condensation as determined by the acid number of the reaction product which should preferably be between about 5 and 50.

The other component of the binder employed herein is styrene, which is to be understood as inclusive of its functional derivatives such as the side chain-substituted styrenes as for example alpha methyl styrene, alpha ethyl styrene and the like, and ring-substituted styrenes such as ortho, meta and para-alkyl styrenes as for example o-methyl styrene, p-ethyl styrene, meta-propyl styrene, 2,4-dimethyl styrene, 2,5-diethyl styrene and the like. The styrene compound should be employed in proportions of about 0.4 to 0.65 part by weight per part of unsaturated polyester resin.

In some instances, improved results may be obtained by addition to the esterification medium or to the binder containing the polyester resin and the styrene compound, of a small amount of a polymerization inhibitor such as hydroquinone, ditertiary-butylhydroquinone, benzaldehyde, ascorbic acid, resorcinol, and the like. Better control of the copolymerization reaction occurring in the molding operation, stabilization of the molding composition during the premolding period, and a more uniform product may be thereby obtainable.

The molding compositions of my invention also contain about 0.3 to 5% and preferably about 0.5 to 1.0%, by weight of the binder resin, of a copolymerization catalyst, which operates to accelerate the copolymerization between the styrene and the unsaturated polyester resin during molding. The preferred catalyst is benzoyl peroxide, but other catalysts may be employed, preferably of the organic peroxide type. As representative of other catalysts there may be mentioned cumene hydroperoxide, methyl ethyl ketone peroxide, phthalic peroxide, succinic peroxide, lauroyl peroxide, and the like.

As an essential component of the molding compositions of my invention, there must be present about 0.5 to 0.7 part, for each part by weight of the binder, of small cloth pieces having a basis of molecularly oriented, high tenacity, hydrophobic, synthetic, organic, thermoplastic linear polymeric fibers melting above about 450° F. The size of the pieces should range from about 0.5 to 4 square inches in area, and the fibers or yarns in the cloth should be no shorter than about ¾" or longer than about 2¼". This type of fibrous filler has been found necessary for the attainment of the desired improved molded products, particularly molded industrial wheels.

The cloth pieces may be woven, knitted, or otherwise fabricated of twisted yarns composed of filaments having the above properties. They are available currently under the broad types of superpolyamides, polyesters, and polyacrylonitriles. Those preferred are the superpolyamides, more commonly referred to as nylon. There are various types of nylon on the market, all being synthetic linear superpolyamides as produced by polymerization of an amino carboxylic acid, or by reaction between an aliphatic diamine and a dicarboxylic acid. The nylon preferred for use herein is nylon 66, as derived from adipic acid and hexamethylene diamine, but others may be employed such as nylon 6, derived from omega-aminocaproic acid, nylon 610, derived from sebacic acid and hexamethylene diamine, and the like.

The polyester fibers are those generally produced by reaction between terephthalic acid and a glycol such as ethylene glycol, propylene glycol, and the like. They are available on the market under the trademarks Terylene and Dacron, being essentially polyethylene terephthalate.

Polyacrylonitrile fibers having the required properties have been available on the market under the trademark Orlon 81.

All of these fibers may be composed of 100% polymer or have admixed therewith small amounts up to about 10% of other resins, plasticizers and the like which do not affect their required properties as above defined. All of these fibers are thermoplastic and may be molecularly oriented by stretching during manufacture to acquire a high tenacity of the order of over about 4.5 grams per denier. They are also all hydrophobic, have a low water absorption, and all melt above about 450° F., more particularly in the range of about 480 to 500° F. The fibers having the above defined properties provide the molded article with high impact strength, high tenacity, toughness and the like, because of their peculiar coaction with the binder resins during the molding operation and afterwards. Because of the thermoplasticity of these fibers, their high melting points, the properties of the binder resin, and the conditions of molding, only the surfaces of the fibers become fused and integrally bonded into the thermoset binder resin. This promotes highly desirable properties occasioned by homogeneity, with retention of most of the tensile strength, impact strength, hydrophobicity, resistance to heat and abrasion, and the like, of the fibers. The small size of the pieces of cloth is necessary in order to promote proper distribution of the binder resin therethrough and prevent fouling of the mixing blades, while pieces which are too short do not provide the desired tensile strength.

The particular combination of binder resin and synthetic cloth pieces described above has been found to be so cooperative and compatible in the preliminary mixing and in the molding operation that crazing is eliminated and many manufacturing steps are eliminated or simplified. For example, all drying and pre-baking operations are eliminated. The bulk factor of the combination described above is much lower than the bulk factor of ten to one attributable to the previously employed mixtures of phenolic resins and cellulose filler.

As a further feature of this invention, it has been found that still further improved results may be obtained by including in the molding composition about 0.4 to 0.6 part of aluminum silicate pigment in finely divided form, as kaolin, per part of binder resin. The inclusion of this material has been found to still further reduce the bulk factor of the molding composition to as low as about 1½ to 1 to 1 to 1. Consequently, the use of pre-form presses and preform molds is eliminated and the molding compositions of my invention may be inserted into the mold directly after mixing and molded for a relatively short period of time at a relatively low pressure to attain the improved molded products desired herein. In addition, the inclusion of the kaolin in the molding compositions of my invention imparts improved chemical resistance, heat stability, and resistance to abrasion to the resulting molded articles. Although any finely divided kaolin may be employed, including hydrated kaolin, it is preferred to employ a product which has been calcined, for example in an autoclave at about 700° F. followed by grinding to the desired particle size. The resulting anhydrous aluminum silicate pigment is non hygroscopic. Such a product is available on the market under the trademark Satintone.

In producing molded products in accordance with the instant invention, the binder resin is admixed with the copolymerization catalyst followed by addition thereto of the aluminum silicate pigment. The required amount of fiber filler consisting of small cloth pieces described above is then added and intimately mixed, the resulting molding composition being in the form of a thick viscous mass. The required amount of molding composition is then inserted into the mold cavity, heated to the required temperature and a sufficient amount of pressure applied to complete the molding operation in a period of time which may range from about 3 to 10 minutes. The pressure and temperature applied must be sufficient to fully cure the binder resin and so that the surfaces of the fibers in the mixture are fused and integrally bonded into the thermoset binder resin. It will be understood that the particular temperature and pressure employed in any particular instance will be dependent upon the size of the charge, the proportions of the components, the particular type of fiber and binder resin, and the like. In general, pressures of about 500 to 1000 pounds per square inch and temperatures of about 250 to 300° F. are usually employed to secure products having maximum density and which are fully cured and thermoset in hard finished condition after completion of the molding operation. It will be seen that the above defined range of temperatures is below the melting points of the fibers employed, but because of the peculiar nature of the binder resin employed, the exothermic reaction taking place within the mold is sufficient to cause the desired fusion at the surfaces of the fibers. The integral bonding between the fiber and the binder resin is also aided by their compatibility with each other, and the fact that in the copolymerization process taking place therein gases are not evolved, as occurs for example in the previously employed phenolic resins, at the intersurfaces between the fibers and binder resin which would act to prevent the desired fusion and integral bonding.

It is important in carrying out the molding operation of the instant invention to employ the correct proportions and conditions of ingredients. Thus, if the proportion of fiber cloth filler to resin is too high, there will be insufficient wetting of the fibers by the binder resin and insufficient fusion, resulting in a heterogeneous molded product, and the like. If an insufficient amount of fiber is employed, resin-rich areas and crazing result. If too much aluminum silicate pigment is employed, the mixture becomes too dry and powdery and there is an insufficient wetting and bonding of the fibers and pigment by the resin. An insufficient amount of aluminum silicate pigment will not achieve the desired results with respect to reduction in the bulk factor, resistance to abrasion and the like. In preparing the binder resin, too much styrene will produce a molding composition which is too liquid and which will prevent proper fusion during the molding operation, and the molded article, as for example an industrial wheel, will blow up. If insufficient styrene is employed the mixture becomes to viscous to handle and charge into the mold in uniform manner. The use of a larger proportion of copolymerization catalyst in the binder resin will produce faster curing but also a shorter period of stability and shorter shelf life in addition to increasing the brittleness of the product and also possible shrinkage resulting in a distorted product. A too small amount of catalyst will result in an unduly long, uneconomical baking time in the mold. Too high a temperature in the molding operation will also tend to produce brittleness. Too low a temperature in the molding operation may result in failure to trigger the exothermic copolymerization reaction in the binder resin curing reaction, or unduly prolong the curing time.

The following examples, in which parts are by weight unless otherwise indicated, are illustrative of the instant invention and are not to be regarded as limitative.

BINDER RESIN A

An unsaturated polyester resin is prepared by coreacting 1.0 mole of maleic anhydride, 2.0 moles of phthalic anhydride, and 3.3 moles of propylene glycol, preferably in an inert atmosphere such as carbon dioxide or nitrogen and temperatures between about 300 and 460° F. Attainment of the desired unsaturated polyester resin is indicated when an acid number of about 30 to 40 is reached. 62.0 parts of the resulting polyester resin are mixed with 38.0 parts of styrene and 0.008 part of hydroquinone.

BINDER RESIN B

This binder resin is prepared in the same manner as binder resin A, but employing 2.0 moles of maleic anhydride and 1.0 moles of phthalic anhydride instead of the proportions in resin A, and proportions of polyester resin to styrene of 67.0:33.0 instead of the 62.0:38.0 in resin A.

BINDER RESIN C

This resin is produced in the same manner as resin B except that 3.0 moles of maleic anhydride are substituted for the 2.0 moles of maleic anhydride and 1.0 of phthalic anhydride in resin B.

*Example*

To 46 parts of any of binder resins A, B or C, there is added 0.5 part of a commercially available catalyst consisting of equal parts of benzoyl peroxide and tricresyl phosphate, and 0.5 part of a suitable coloring pigment, and the ingredients intimately mixed for five minutes in air at room temperature. The resulting activated liquid binder resin is uncured and will remain stable for about 48 hours at about 70° F.

23 parts of aluminum silicate pigment (kaolin) of 400 screen are then intimately admixed with the above activated liquid resin binder for a period of five minutes at room temperature. The resulting mixture is liquid, uncured, and of an opaque milky color.

To the above mixture there is then added 30 parts of cloth woven from continuous filaments nylon 66 yarn having a tenacity of about 6.0 grams per denier and chopped into squares measuring from about 1.0 to 1.5″ along the edges. The chopped cloth is intimately mixed into the mixture at room temperature for about 12 minutes, the resulting molding composition being thick, viscous, and very adhesive.

The molding composition is then carefully subdivided into molding charges of predetermined weight and the charges placed into mold cavities in the form of industrial wheels. Each charge is baked in its closed mold cavity for five minutes at 260 to 290° F. under a pressure of 700 to 1000 pounds per square inch, to secure maximum density. The binder resin is thus converted to its final and fully cured thermoset and hardened condition, with the fibers therein fused at their surfaces and bonded integrally into the thermoset resin. The molded wheels are then removed in finished condition from the cavity.

The molded articles produced in accordance with my invention have very much better physical and other properties than found in conventional plastic molded products, particularly the phenolic resin-cellulose filler combinations. It is known that crazing occurs wherever there is a resin-rich area, and where the resin either lacks sufficient elasticity to absorb the shrinkage caused by the conversion from liquid to solid, or does not contain sufficient filler to reduce the percent of shrinkage. The fiber filler employed in the instant invention reduces the shrinkage because of its compatability with the binder resin, thereby increasing the elasticity thereof. This increased elasticity is particularly valuable in the manufacture of industrial wheels in improving the traction and increasing the hysteresis factor of the wheels. Further, it is not necessary to use presaturation of modifying resins to inhibit chemical reaction with the filler, nor is it necessary to prepare the combination in such ways as to guard against crazing of the article during molding, which is necessary when the resin and filler are not as defined herein.

The molded article with a nylon filler was found to have an impact strength of 3.4 foot pounds per inch of notch as measured on the Izod ½ x ½ inch notched bar test (A.S.T.M. Method No. 256), whereas similar articles molded from the phenolic compositions ran on the order of 1.8 foot pounds per inch of notch in the same test.

In a test made according to A.S.T.M. Method No. D648-45T, it was found that the improved final product does not distort under a pressure of 66 pounds per square inch, up to temperature of 194° F., even if said temperature is continuously maintained. The continuous use of phenolic resins at above 120° F. is not recommended, especially under substantial pressure. The resistance to pressure under continuous high temperature is a valuable feature.

The improved final product has a low water absorption factor of only 0.28% (A.S.T.M. Test No. D570-42), whereas this factor is about 2.5% to 5% in usual phenolic thermosetting resins.

The improved product has a compressive strength of 21,000 pounds per square inch, whereas the usual phenolic resin-filler combinations may have a compressive strength as low as 15,000 pounds per square inch.

The resistance to abrasion of the final product is a highly desirable factor in making wheels. Tests have been made on a breakdown machine which simulated actual working conditions, in which the wheels were tested at a linear speed of 3.2 miles per hour, which is normal operating speed.

These tests were also carried out on 40 wheels on the market, made of a thermoset phenol-aldehyde resin with a macerated canvas duck filler. The phenolic wheels showed very substantial wear at the tread, at from 10 miles to 23 miles of normal operation at said normal operating speed of 3.2 miles per hour.

The wheels which were made from the improved composition of my invention, of the same size, after testing corresponding to 50 miles of normal operation, wore at their treads only to the extent of a few thousandths of an inch.

In making these tests, the test wheels were equipped with standard alloy steel roller bearings. The load on each wheel corresponded to 675 pounds. The diameter of the wheels were six inches. Their tread width was two inches. Due to high friction and heat under load, the phenolic wheels became so hot that many of their hubs cracked.

The wheels which were made from my improved composition remained cool, due to their very high radiation of heat, and none of the roller bearings was heated above 200° F.

These tests failed to show all of the advantages of the improved wheels, because they simulated use on a smooth and planar supporting surface. In actual use, the supporting surfaces are abrasive, if made of rough concrete, asphalt, etc., and such supporting surfaces have ruts and also have projections, such as door sills, curbing, etc. Also, in actual use, the supporting surfaces are often covered with water, grease, oils, alkalis, and other chemicals.

Tests have shown that when the usual phenolic wheels made continuous contact with water, oils or greases, the protective skins of their treads wore off after normal operation in a distance of from 0.5 mile to 1.5 miles. The tread then cracked off in large granular pieces, so that the ordinary wheel deteriorated very rapidly.

Similar tests under the same conditions in the presence of water, oils, greases, alkalis showed that my improved wheel was much superior in resisting abrasion and deterioration, due to the use of the improved combination of the defined binder resin with nylon. In fact, there was no more noticeable difference in wear of the wheels in the presence of these chemicals than when run under ideal conditions.

It will be understood that products of my invention similar to those discussed above but containing polyester or polyacrylonitrile cloth filler instead of nylon likewise exhibit greatly improved properties as compared with prior art products.

This application is a continuation in part of my application Serial No. 495,985, filed March 22, 1955 now abandoned, entitled Plastic Molding Composition.

This invention has been disclosed with respect to certain preferred embodiments, and various modifications and variations thereof will become obvious to persons skilled in the art. It is to be understood that such modifications and variations are to be included within the spirit and scope of the instant application.

I claim:

1. A molding composition comprising (1) as a binder, a mixture of (a) an unsaturated polyester resin having an acid number of about 5 to 50 and obtained by reaction of a glycol with a member of the group consisting of α-ethylenically unsaturated-α,β-dicarboxylic acids and mixtures containing at least about 20% by weight of said unsaturated dicarboxylic acids with saturated dicarboxylic acids, and (b) about 0.4 to 0.65 part by weight of styrene per part of said unsaturated polyester resin, and, for each part by weight of said binder, (2) about 0.003 to 0.05 part of an organic peroxide catalyst for accelerating the copolymerization of said styrene and polyester resin, (3) about 0.5 to 0.7 part of a fibrous filler consisting essentially of cloth pieces of about 0.5 to 4 square inches in area and made of molecularly oriented, high tenacity, hydrophobic, synthetic, organic, thermoplastic, linear polymeric fibers melting above about 450° F., and (4) about 0.4 to 0.6 part of finely divided kaolin.

2. A molding composition as defined in claim 1 wherein said polymeric fibers are composed of nylon.

3. A process for producing a molded article of manufacture comprising molding a composition as defined in claim 2 under conditions of temperature ranging from about 250 to 300° F. and pressure ranging from about 500 to 1000 pounds per square inch such that the surfaces of said fibers are fused and integrally bonded into the thermoset, copolymerized binder.

4. A molded article of manufacture produced in accordance with the process of claim 3.

5. A molding composition as defined in claim 1 wherein said unsaturated polyester resin is obtained by reaction of propylene glycol with maleic anhydride.

6. A process for producing a molded article of manufacture comprising molding a composition as defined in claim 5 under conditions of temperature ranging from about 250 to 300° F. and pressure ranging from about 500 to 1000 pounds per square inch such that the surfaces of said fibers are fused and integrally bonded into the thermoset, copolymerized binder.

7. A molded article of manufacture produced in accordance with the process of claim 6.

8. A molding composition as defined in claim 1 wherein said unsaturated polyester resin is obtained by reaction of propylene glycol with a mixture of maleic anhydride and phthalic anhydride.

9. A process for producing a molded article of manufacture comprising molding a composition as defined in claim 8 under conditions of temperature ranging from about 250 to 300° F. and pressure ranging from about 500 to 1000 pounds per square inch such that the surfaces of said fibers are fused and integrally bonded into the thermoset, copolymerized binder.

10. A molded article of manufacture produced in accordance with the process of claim 9.

11. A process for producing a molded article of manufacture comprising molding a composition as defined in claim 1 under conditions of temperature ranging from about 250 to 300° F. and pressure ranging from about 500 to 1000 pounds per square inch such that the surfaces of said fibers are fused and integrally bonded into the thermoset, copolymerized binder.

12. A molded article of manufacture produced in accordance with the process of claim 11.

References Cited in the file of this patent

UNITED STATES PATENTS

| | | |
|---|---|---|
| 2,491,409 | Kropa et al. | Dec. 13, 1949 |
| 2,680,105 | Baker | June 1, 1954 |

FOREIGN PATENTS

| | | |
|---|---|---|
| 594,579 | Great Britain | Nov. 14, 1947 |
| 622,235 | Great Britain | Apr. 28, 1949 |
| 158,148 | Australia | Aug. 10, 1954 |
| 158,149 | Australia | Aug. 10, 1954 |